(12) United States Patent
Chretien et al.

(10) Patent No.: US 9,216,891 B2
(45) Date of Patent: Dec. 22, 2015

(54) REFUELING ASSEMBLY INCLUDING A FLOW GUIDE

(71) Applicant: Ford Global Technologies, LLC, Dearborn, MI (US)

(72) Inventors: Paul Chretien, Commerce Township, MI (US); Michael Wohlfahrter, Pulheim (DE); Shahid Siddiqui, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 13/683,699

(22) Filed: Nov. 21, 2012

(65) Prior Publication Data

US 2013/0213963 A1 Aug. 22, 2013

Related U.S. Application Data

(60) Provisional application No. 61/599,552, filed on Feb. 16, 2012.

(51) Int. Cl.
| | |
|---|---|
| *B67C 3/34* | (2006.01) |
| *B67D 7/06* | (2010.01) |
| *B60K 15/04* | (2006.01) |
| *B65B 1/00* | (2006.01) |

(52) U.S. Cl.
CPC . *B67D 7/06* (2013.01); *B60K 15/04* (2013.01); *B60K 2015/0429* (2013.01); *B60K 2015/0461* (2013.01)

(58) Field of Classification Search
CPC ............... B60K 2015/0461; B60K 2015/0483; B60K 2015/049
USPC ........................................ 220/86.2, 86.3, 86.1
See application file for complete search history.

(56) References Cited

U.S. PATENT DOCUMENTS

| | | | | |
|---|---|---|---|---|
| 4,966,299 | A * | 10/1990 | Teets et al. ..................... | 220/746 |
| 5,322,100 | A * | 6/1994 | Buechler et al. ............... | 141/312 |
| 5,839,489 | A * | 11/1998 | Ganachaud et al. .......... | 141/382 |
| 5,860,460 | A * | 1/1999 | Hidano et al. ................ | 141/286 |
| 5,975,165 | A | 11/1999 | Motosugi et al. | |
| 6,405,767 | B1 * | 6/2002 | Marsala et al. ............... | 141/286 |
| 6,523,582 | B2 * | 2/2003 | Furuta .......................... | 141/286 |
| 6,886,613 | B1 * | 5/2005 | Zahdeh ......................... | 141/286 |
| 8,096,332 | B2 * | 1/2012 | Hagano ......................... | 141/285 |
| 2006/0032552 | A1 * | 2/2006 | Hedevang ..................... | 141/367 |
| 2013/0186894 | A1 * | 7/2013 | Salzberger et al. .......... | 220/86.2 |

* cited by examiner

*Primary Examiner* — Mickey Yu
*Assistant Examiner* — Niki Eloshway
(74) *Attorney, Agent, or Firm* — Julia Voutyras; Alleman Hall McCoy Russell & Tuttle LLP

(57) ABSTRACT

A refueling assembly of an engine is provided. The refueling assembly includes a housing, a door positioned within the housing and a flow guide positioned within the housing and downstream of the door including an inlet in fluidic communication with the door, an outlet to flow fuel into a downstream filler pipe in fluidic communication with a fuel tank during a refueling operation, a planar nozzle seating section receiving a fuel nozzle during the refueling operation, and a contraction section positioned downstream of the planar nozzle seating section.

8 Claims, 4 Drawing Sheets

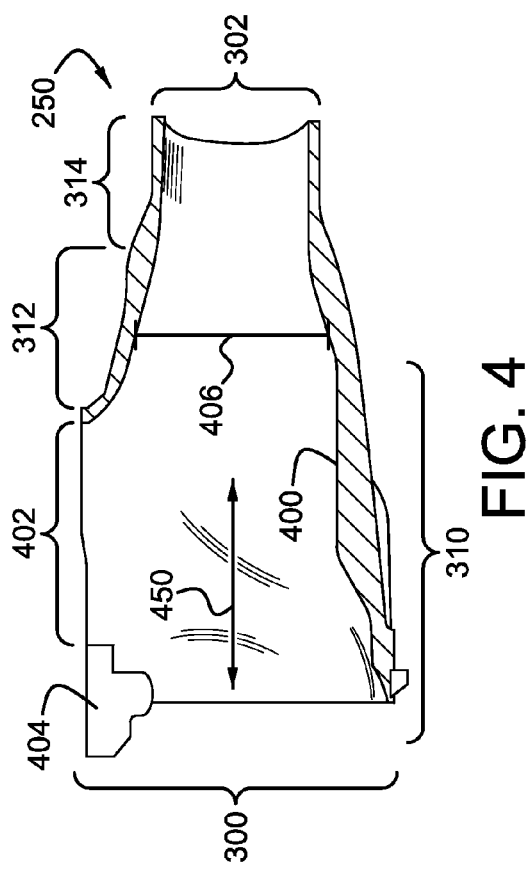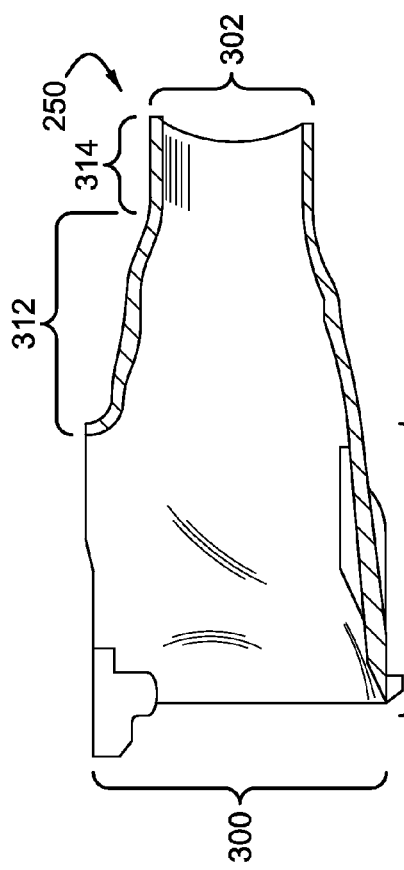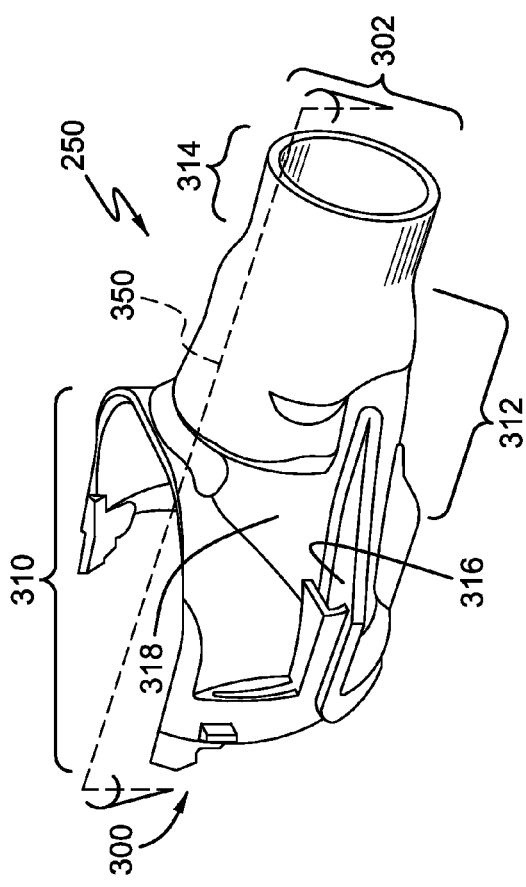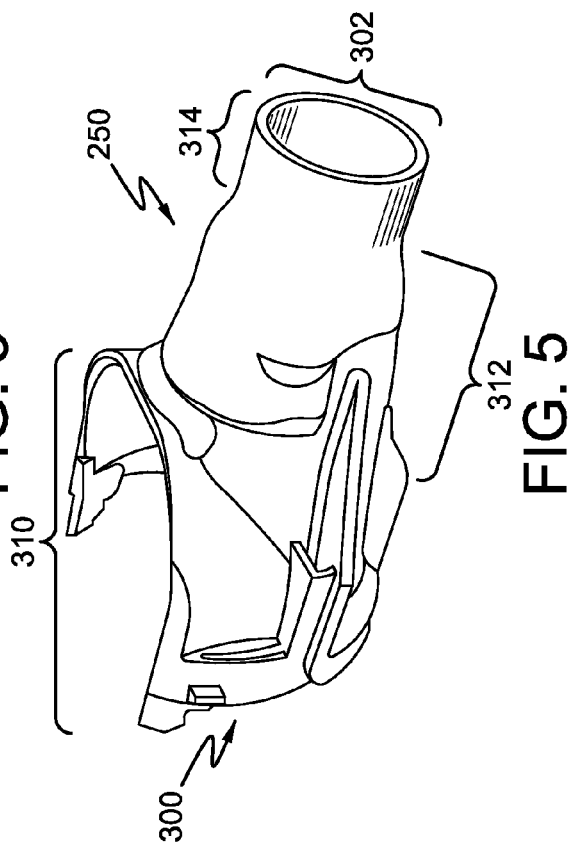

REFUELING ASSEMBLY INCLUDING A FLOW GUIDE

CROSS-REFERENCE TO RELATED APPLICATIONS

This application claims priority to U.S. application No. 61/599,552 filed on Feb. 16, 2012, the entire contents of which are hereby incorporated herein by reference for all purposes.

BACKGROUND/SUMMARY

Refueling assemblies for engines have been developed to enable an operator to quickly and easily refill a fuel tank. Refueling assemblies may include a fuel cap. However, the cap may become lost, misplaced, etc., during refueling operation. Moreover, the evaporative vehicle emissions may be increased when a cap is used, due to the fuel vapor loss that occurs when the cap is removed.

Cap-less refueling assemblies have been developed to reduce evaporative emissions as well as simplify the refueling process. The cap-less refueling assembly may include a spring loaded interior lid to enable the refueling assembly to be sealed when a fuel nozzle is removed from the assembly.

However, the Inventors have recognized several drawbacks with this type of refueling assembly. Firstly, premature shut-off of the fuel nozzle during refueling may occur due to the pressure differential which develops in the refueling assembly. Fuel fill system shut off is historically based on sensing a pressure differential: P2 (nozzle shut-off pressure during refueling)–P1 (fuel tank peak fill pressure). Moreover, air entrapment in the refueling assembly may occur during refueling. Additionally, carbon canister loading may be increased. Moreover, due to the geometric configuration of various flow guides in the refueling assembly, the pressure differential in the fuel tank over the entire refueling process is decreased, thereby increasing the refueling duration.

To solve at least some of the aforementioned disadvantages a refueling assembly of an engine is provided. The refueling assembly includes a housing, a door positioned within the housing and a flow guide positioned within the housing and downstream of the door including an inlet in fluidic communication with the door, an outlet to flow fuel into a downstream filler pipe in fluidic communication with a fuel tank during a refueling operation, a planar nozzle seating section receiving a fuel nozzle during the refueling operation, and a contraction section positioned downstream of the planar nozzle seating section. The geometry of the flow guide in this example reduces entrained air, where entrained air alters the pressure differential that signals shut off. Thus, minimizing entrained air optimizes this pressure differential and limits premature shut-off.

The planar nozzle seating section enables the movement of the fuel nozzle to be reduced during refueling, thereby decreasing local pressure sensitivity and decreasing the likelihood of premature shut-off of the fuel nozzle during a refueling operation. The flow guide may also include an extension section, having a constant inner diameter, positioned downstream of the contraction section. The extension section enables the likelihood of air entrapment in the refueling assembly to be reduced during a refueling operation. Additionally, the contraction section may be conical. The conical geometry enables the localized pressure sensitivity in the flow guide to be reduced. As a result, the likelihood of premature shut-off of the fuel nozzle during refueling may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3 and 4 show an illustration of the flow guide in the refueling assembly shown in FIG. 2.

FIGS. 5 and 6 show a second embodiment of the flow guide.

FIGS. 2-8 are drawn approximately to scale.

DETAILED DESCRIPTION

A refueling assembly with a flow guide having geometric configuration which reduces localized sensitivity of premature shut-off of a fuel nozzle during a refueling operation is disclosed herein. Furthermore, the geometric configuration of the flow guide may also be conducive to increasing the pressure differential in the fuel tank over an entire refueling operation. As a result, the duration of refueling is decreased. Various features which may be incorporated into the flow guide to achieve the aforementioned objectives include a contraction section that may be conical as well as an extension section which may have a substantially constant diameter. Additionally, the flow guide may include a nozzle seating section having a planar surface. The planar surface enables the movement of a fuel nozzle inserted into the refueling assembly during a refueling operation to be reduced. As a result, the likelihood of premature shut-off of the fuel nozzle may be further reduced.

Figure 1:
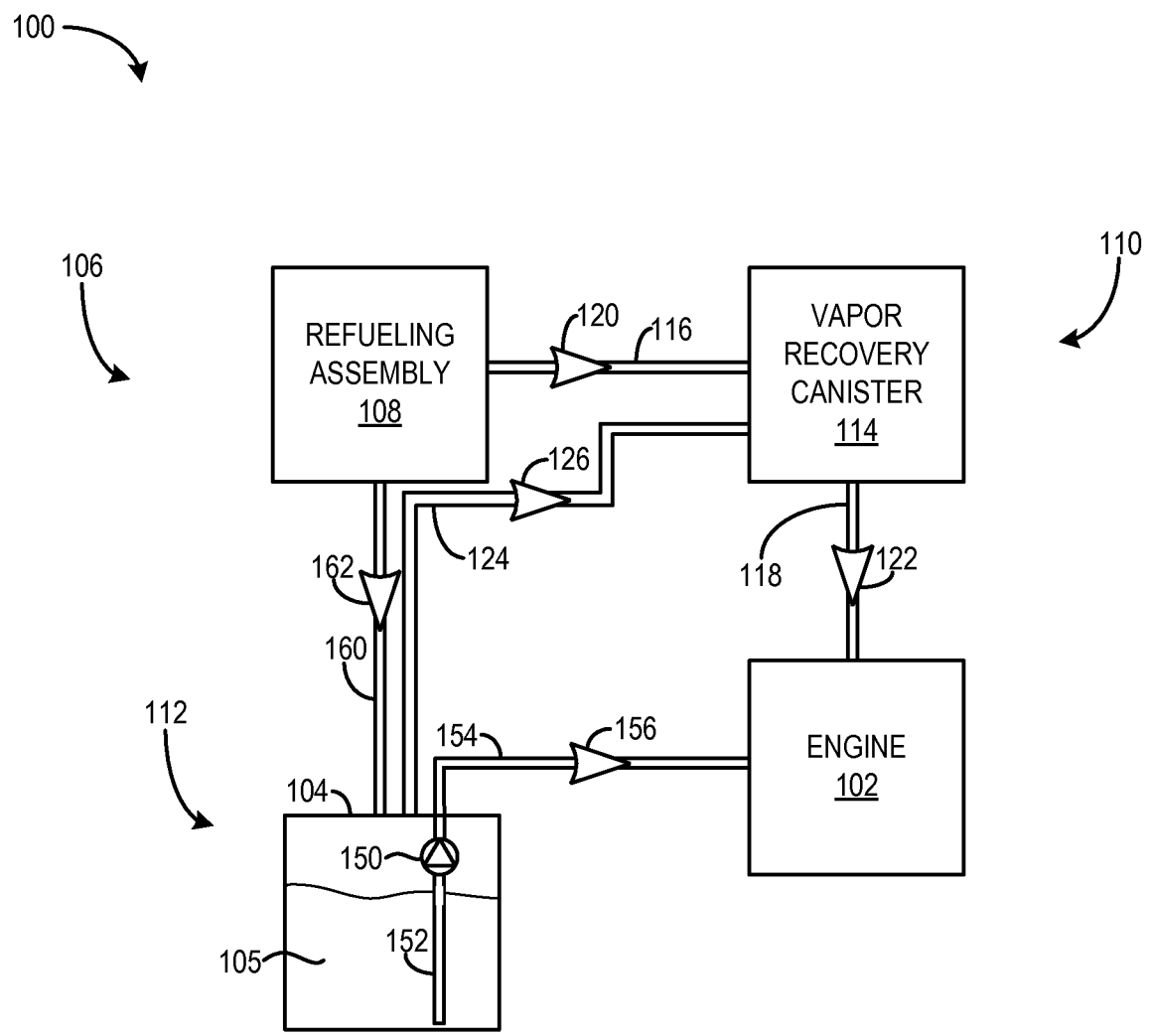
FIG. 1 shows a schematic depiction of a vehicle having an engine and a refueling assembly.

FIG. 1 shows a vehicle 100. The vehicle 100 includes an engine 102, a fuel tank 104, a refueling system 106 including a refueling assembly 108, and a vapor recovery system 110. The fuel tank 104 houses a suitable fuel 105 such as gasoline, ethanol, diesel, etc. The engine 102 is configured to perform combustion in one or more cylinders. The engine 102 may include an intake system and an exhaust system to enable combustion in the cylinders.

The vehicle 100 may also include a fuel delivery system 112 configured to provide metered fuel to the engine 102, to enable the engine to perform combustion. The fuel delivery system 112 may include the fuel tank 104. The fuel delivery system 112 may also include injectors, a second pump, valves, etc., to enable the system to deliver fuel to the engine 102. The fuel delivery system 112 may include a pump 150 having a pick-up tube 152 positioned within the fuel tank 104. The pump 150 is in fluidic communication with various components in the engine 102 via a fuel passage 154. Arrow 156 denotes the flow of fuel 105 from the pump 150 to the engine 102. The refueling assembly 108 and the fuel tank 104 are in fluidic communication via a fuel passage 160. Arrow 162 denotes the flow of fuel through the fuel passage 160.

Furthermore, the vapor recovery system 110 may be configured to capture evaporative emissions from the vehicle 100 and deliver the evaporative emissions to the engine 102 for combustion. The vapor recovery system 110 includes the vapor recovery canister 114, passage 116, and passage 118. Passage 116 is in fluidic communication with the refueling assembly 108 and the vapor recovery canister 114. Arrow 120 denotes the flow of fuel vapor from the refueling assembly 108 to the vapor recovery canister 114. Additionally, passage 118 is in fluidic communication with the vapor recovery canister 114 and the engine 102. Arrow 122 denotes the flow of fuel vapor from the vapor recovery canister 114 to the engine 102. In this way, passage 116 may receive fuel vapor from the refueling assembly 108 and passage 118 may flow fuel vapor to the engine 102. Furthermore, a passage 124 in fluidic communication with the fuel tank 104 and the vapor recovery canister 114 may also be included in the vapor recovery system 110. Arrow 126 denotes the flow of fuel vapor from the fuel tank to the vapor recovery canister 114. It will be appreciated that additional passages, valves, etc., may be included in the vapor recovery system to enable fuel vapor to be flowed to the engine 102 from the vapor recovery canister 114 as well as from the fuel tank 104 and the refueling assembly 108 to the vapor recovery canister.

The refueling assembly 108 may include a number of components configured to enable cap-less refueling, decrease air entrapment in the assembly, decrease the likelihood of premature nozzle shut-off during refueling, as well as increase the pressure differential in the fuel tank over an entire refueling operation, thereby decreasing the duration of refueling.

Figure 2:
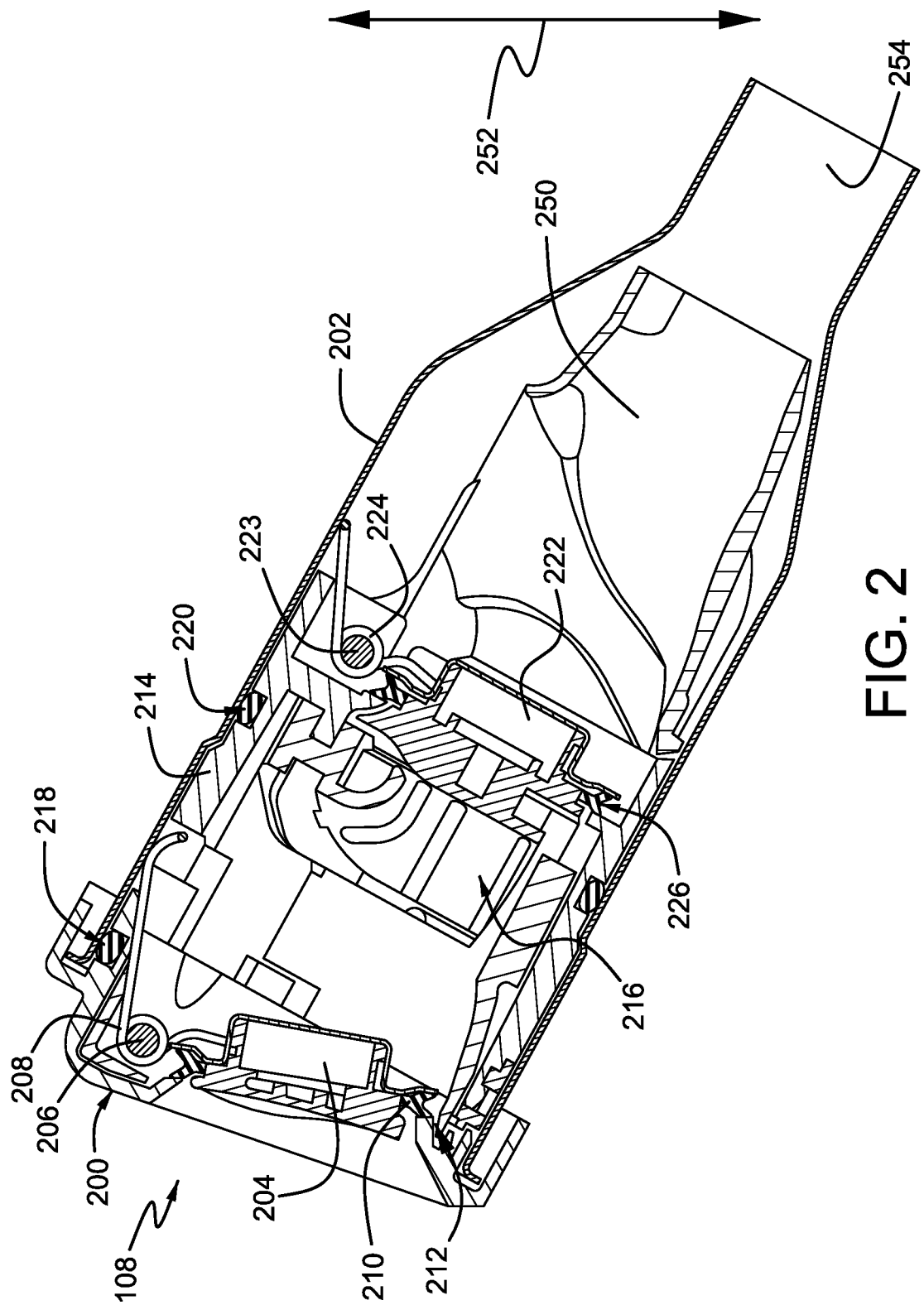
FIG. 2 shows an illustration of the refueling assembly depicted in FIG. 1.

FIG. 2 shows a refueling assembly 108. The refueling assembly 108 includes a cover 200. The cover 200 is configured to enclose components in the assembly. The refueling assembly further includes an external housing 202 configured to at least partially enclose various internal components of the refueling assembly 108. The refueling assembly 108 further includes an upstream door 204 having a hinge 206. The upstream door 204 is inset from the cover 200. A preloaded upstream spring 208 may be coupled to the upstream door 204 and the external housing 202. The preloaded upstream spring 208 coupled to the upstream door 204 providing a return force to the door when opened. The upstream spring 208 is configured to provide a return force when the upstream door 204 is depressed via a fuel nozzle. In this way, the upstream door 204 may close after a fuel nozzle is removed during a refueling event. Thus, the upstream door 204 automatically closes without assistance from a refueling operator. As a result, the refueling process is simplified.

A seal 210 may be attached to the upstream door 204. Specifically, the seal 210 may extend around the periphery of the upstream door 204, in some examples. When the upstream door 204 is in a closed position the seal may be in face sharing contact with the cover 200. In this way, the evaporative emissions from the refueling assembly 108 are reduced.

The refueling assembly 108 further includes a locking lip 212. The locking lip 212 may be configured to receive a portion of a fuel nozzle. In some examples, the locking lip 212 may be provided around at least 100° of the inside circumference of the refueling assembly 108. The locking lip 212 may influence the positioning and angle of the fuel nozzle axis spout during refueling and therefore has an impact on filling performance.

The refueling assembly 108 further includes an internal housing 214. The walls of the internal housing 214 may define a nozzle enclosure configured to receive a fuel nozzle. The internal housing 214 may also include a nozzle stop actuator 216 configured to actuate a portion of the fuel nozzle that initiate fuel flow from the fuel nozzle.

An upstream body seal 218 and a downstream body seal 220 may be provided in the refueling assembly 108 to seal the external housing 202 and various internal components in the refueling assembly 108. Specifically, the upstream and downstream body seals (218 and 220) are configured to extend between the external housing 202 and the internal housing 214. The upstream body seal 218 and/or downstream body seal 220 may be an O-ring in some examples.

The refueling assembly 108 further includes a downstream door 222 positioned downstream of the upstream door 204 and the nozzle stop actuator 216. The downstream door 222 includes a hinge 223 and has a preloaded downstream spring 224 coupled thereto. The preloaded downstream spring 224 is coupled to the downstream door 222 providing a return force to the downstream door 222 when opened. The downstream spring 224 is also coupled to the external housing 202. The spring 224 is configured to provide a return force to the downstream door 222 when the downstream door 222 is in an open position. The downstream door 222 may also include a seal 226 (e.g., flap seal). The seal 226 may be positioned around the periphery of the downstream door 222, in some examples. The downstream door 222 enables the evaporative emissions during the refueling process to be further reduced. The downstream door 222 is arranged perpendicular to the fuel flow when closed, in the depicted example. However, other orientations of the downstream door 222 are possible.

The refueling assembly 108 may be positioned in a number of configurations in the vehicle 100, shown in FIG. 1. In one example, the refueling assembly 108 has a downward gradient. In other words, the upstream door 204 is positioned vertically above a flow guide 250 with regard to a gravitational axis 252. In this way, fuel flow is assisted via gravity during refueling operation.

The refueling assembly 108 includes the flow guide 250 which is arranged downstream of the downstream door 222. The refueling assembly 108 further includes a filler pipe 254. The flow guide 250 may be at least partially enclosed by the filler pipe 254. The filler pipe 254 is in fluidic communication with the fuel tank 104 via fuel passage 160 shown in FIG. 1.

FIG. 3 shows a perspective view of an example flow guide 250. As shown, the flow guide includes an inlet 300 and an outlet 302. The inlet 300 may receive a fuel nozzle during a refueling operation. The outlet 302 may flow fuel to downstream components (e.g., filler pipe, fuel tank) during a refueling operation. The inner diameter of the outlet 302 may be selected to reduce the likelihood of premature shut-off of a fuel nozzle during refueling. The inner diameter of the outlet 302 may be between 20 to 25 mm.

The flow guide 250 may be conceptually divided into a number of sections; a nozzle seating section 310, a contraction section 312, and an extension section 314. The nozzle seating section 310 may receive a fuel nozzle during a refueling operation. The specific geometry and configuration of each of the aforementioned sections is discussed in greater detail herein. The flow guide 250 also includes a reinforcing rib 316 extending down an external surface 318 of the flow guide 250. The reinforcing rib 316 increases the structural integrity of the flow guide 250. Cutting plane 350 defines the cross-section shown in FIG. 4.

FIG. 4 shows a cross-sectional view of the flow guide 250 shown in FIG. 3. The nozzle seating section 310 is shown. The nozzle seating section 310 includes a planar surface 400 for receiving a fuel nozzle during a refueling operation.

The nozzle seating section 310 also includes a door opening 402 configured to receive the downstream door 222, shown in FIG. 2, when opened via a fuel nozzle. Thus, the door opening 402 may be in contact with the downstream door 222 (shown in FIG. 2) during refueling.

Continuing with FIG. 4, the flow guide 250 also includes a door retainer 404 extending into the door opening 402 configured to receive the downstream door 222, shown in FIG. 2. Thus, the door retainer 404 may be in contact with the downstream door 222 during a refueling operation.

The contraction section 312 is also shown. In the depicted embodiment the contraction section 312 is approximately conical. Specifically, the diameter 406 of the contraction section 312 decreases in a downstream direction. When the contraction section 312 is conical the likelihood of premature shut-off of the fuel nozzle is reduced. However, other geometries have been contemplated.

The extension section 314 is also shown. The extension section 314 has a constant interior diameter in the depicted embodiment and forms the outlet of the flow guide 250 leading to a downstream filler pipe 254. However, other geometries have been contemplated. The extension section 314 reduces air entrapment in the refueling assembly 108 (shown in its entirety in FIG. 2) during a refueling operation, thereby decreasing carbon canister loading.

Another embodiment of the flow guide 250 is shown in FIGS. 5 and 6. However, the flow guide 250 shown in FIGS. 5 and 6 includes similar parts to the flow guide 250 shown in FIGS. 3 and 4. Therefore, similar parts are labeled accordingly. The flow guide 250 shown in FIGS. 5 and 6 includes the inlet 300 and the outlet 302. The flow guide 250 also includes the nozzle seating section 310, the contraction section 312, and the extension section 314.

As shown, geometry of the contraction section 312 is not conical. In other words, the interior diameter of the contraction section 312 does not decrease continuously downstream in the flow guide. Instead, the interior of contraction section 312 narrows in a slightly step wise fashion. However, the contraction section 312 of the flow guide 250 shown in FIGS. 5 and 6, has no dramatic transitions (e.g., sharp edges) on its inside surface as it extends to the extension section 314. The contraction section 312 may plateau in the middle with the top line of the contraction section more steeply narrowing at the inlet and outlet sides of the contraction section, with the middle most segment being largely of constant diameter. The shape of this contraction section aids the flow of fuel into fuel tank 104. However, other geometries have been contemplated. The angle at which the contraction section narrows into the extension section may vary. Additionally, the contraction section may not consistently narrow in a conical manner such as is seen in FIG. 4. Also the contraction section need not have symmetrical geometry. For example, the decreasing overall diameter of the contraction section may be largely due to a steep decline of the top line with a more planar bottom portion or vice versa.

Figure 7:
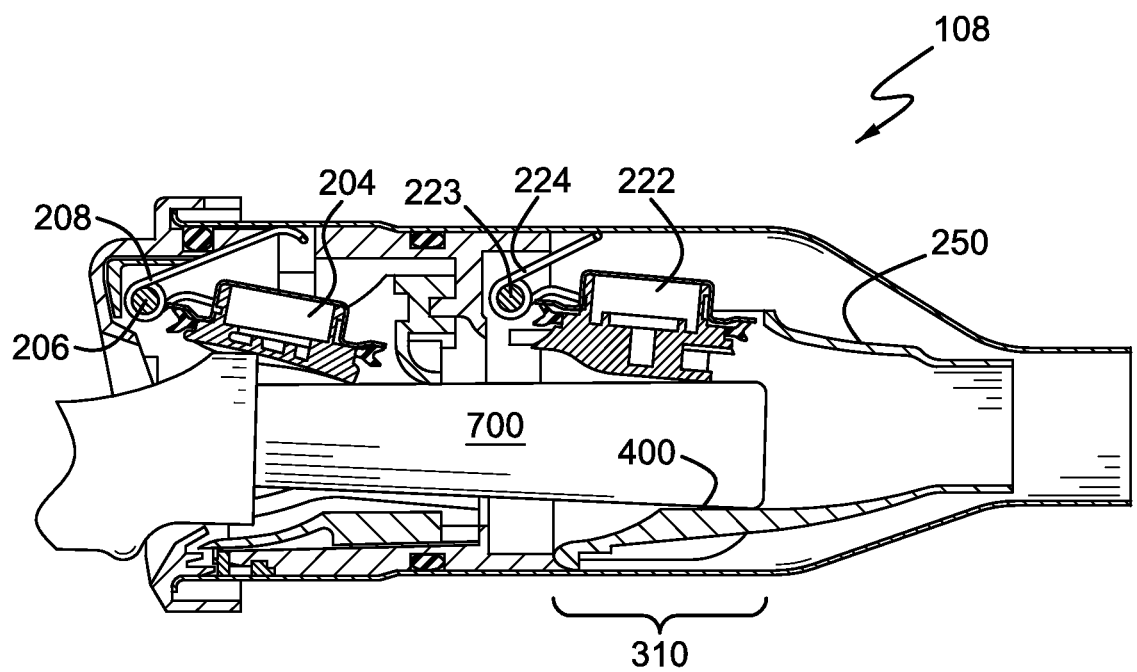
FIG. 7 shows an illustration of a refueling assembly during a refueling operation.

FIG. 7 shows the refueling assembly 108 during a refueling operation when a fuel nozzle 700 is inserted into the refueling assembly 108. The fuel nozzle 700 extends through the upstream and downstream doors (204 and 222) and into the flow guide 250. Thus, the upstream and downstream doors (204 and 222) pivot about hinges (206 and 223) to enable the fuel nozzle 700 to extend into the flow guide 250. The flow guide 250 shown in FIGS. 5 and 6 is included in the refueling assembly 108 shown in FIG. 7. Again, the shape of the contraction section 312 is less conical here than the contraction section 312 of the alternative embodiment of the flow guide 250 seen in FIGS. 3 and 4. The decreasing diameter of contraction section 312 seen in FIG. 7 is occurring mostly at the inlet and outlet portions of the contraction section of flow guide 250, with the middle portion having a less steep angle. The inside diameter of the flow guide at the outlet side of the contraction section 312 is narrower than the inlet side to minimize the occurrence of entrained air. Minimizing entrained air optimizes the pressure differential which signals shut off, thus preventing premature shut-off. However, the flow guide needs to be sized appropriately to accept all standard fuel nozzles while minimizing movement after fuel nozzle insertion. Furthermore, the flow guide allows fuel to exit efficiently so as to prevent fuel levels from rising within the flow guide, resulting in premature shut off.

As shown, the upstream and downstream springs (208 and 224) are contracted to enable movement of the upstream and downstream doors (204 and 222). When fuel nozzle 700 is removed, the spring force of upstream and downstream springs (208 and 224) will immediately close upstream and downstream doors (204 and 222) minimizing evaporative emissions compared to a traditional refueling assembly containing a separate cap.

As shown, the fuel nozzle 700 seats on the planar surface 400 of the planar nozzle seating section of the flow guide 250.

The nozzle stop actuator 216, shown in FIG. 2, allows a standard fuel nozzle size (e.g., the outer diameter of the fuel nozzle) to open the downstream door 222 and inhibits a non-standard size fuel nozzle from opening the downstream door 222. More specifically, the nozzle stop actuator 216 may keep the downstream door 222 locked unless a fuel nozzle with an outer diameter between 20.5 and 21.3 mm allows the latches to release the downstream door 222 from its seat, in some examples.

Figure 8:
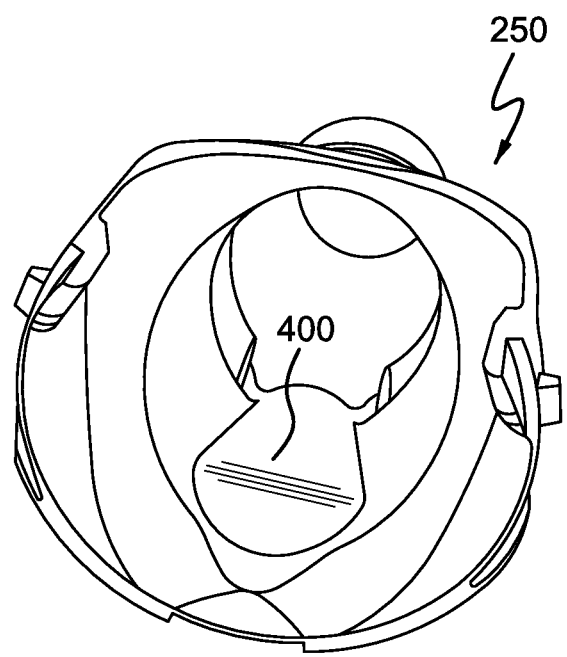
FIG. 8 shows another view of the flow guide shown in FIGS. 3 and 4.

FIG. 8 shows another view of the flow guide 250 shown in FIGS. 3 and 4. The planar surface 400 of the nozzle seating section 310 is depicted. The planar surface 400 is sized to receive a fuel nozzle, such as the fuel nozzle 700 shown in FIG. 7. As shown, the planar surface 400 tapers in the downstream direction, in the depicted embodiment. Furthermore, the planar surface 400 is parallel to a central axis 450 of flow guide 250, shown in FIG. 4. However, other flow guide designs have been contemplated. For example, in another embodiment a flow guide might not have a downward tapering planar surface 400. Instead this planar surface could be a consistent width and rely on the guiding shape of other components of the flow guide to accurately guide fuel nozzle 700 into the flow guide. Alternatively, planar surface 400 could be rounded if advantageous for inserting a fuel nozzle into the flow guide. The fit of the fuel nozzle 700 in the refueling assembly as it becomes the flow guide in minimizing premature shut off events.

The object of the present disclosure is a refueling assembly of an engine comprising, a housing, a door positioned within the housing and a flow guide positioned within the housing. The flow guide is located downstream of the door and comprises an inlet in fluidic communication with the door, an outlet to flow fuel into a downstream filler pipe in fluidic communication with a fuel tank and a planar nozzle seating section receiving a fuel nozzle during the refueling operation. Downstream of the planar nozzle seating section is located a contraction section positioned downstream of the planar nozzle seating section. The design of the refueling assembly of the present disclosure is such that a fuel nozzle sits on the planar nozzle seating section with minimal movement and a flow guide directs fuel flow into the downstream filler pipe efficiently so as to avoid fuel filling within the flow guide or entrained air, either of which can lead to a premature shut-off event.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A refueling assembly of an engine comprising:
   an external housing;
   a door positioned within the external housing; and
   a flow guide positioned within the external housing and downstream of the door, the flow guide including an inlet in fluidic communication with the door; an outlet to flow fuel into a downstream filler pipe in fluidic communication with a fuel tank during a refueling operation; a nozzle seating section receiving a fuel nozzle during the refueling operation, the nozzle seating section including a planar surface which tapers in a downstream direction and is parallel to a central axis of the flow guide; and a contraction section positioned downstream of the planar surface,
   the flow guide further including an extension section having a substantially constant diameter positioned downstream of the contraction section.

2. The refueling assembly of claim 1, further comprising an additional door positioned upstream of the door.

3. The refueling assembly of claim 1, where the flow guide is coupled to an internal housing of the refueling assembly.

4. The refueling assembly of claim 1, further comprising a preloaded spring coupled to the door providing a return force to the door when opened.

5. A refueling assembly of an engine comprising:
   a nozzle stop actuator sized to allow a standard fuel nozzle to open a door, the door positioned downstream of the nozzle stop actuator; and
   a flow guide comprising a nozzle seating section positioned downstream of the nozzle stop actuator and including a planar surface which tapers in a downstream direction, the nozzle seating section receiving the fuel nozzle during a refueling operation; a contraction section positioned downstream of the nozzle seating section; and an extension section downstream of the contraction section that leads to an outlet of the flow guide into a downstream filler pipe, a central axis of the flow guide parallel to the planar surface of the nozzle seating section, the extension section having a substantially constant diameter.

6. The refueling assembly of claim 5, wherein an inner diameter of an outlet of the extension section is between 20 and 25 mm.

7. The refueling assembly of claim 5, wherein the nozzle stop actuator inhibits a non-standard size fuel nozzle from opening the door.

8. The refueling assembly of claim 5, further comprising an additional door upstream of the door that automatically closes without assistance from a refueling operator.

\* \* \* \* \*